US012651315B2

(12) United States Patent
Kang et al.

(10) Patent No.: US 12,651,315 B2
(45) Date of Patent: Jun. 9, 2026

(54) METHOD AND APPARATUS WITH DEGRADED IMAGE RESTORATION

(71) Applicant: Samsung Electronics Co., Ltd., Suwon-si (KR)

(72) Inventors: Eunhee Kang, Yongin-si (KR); Sehwan Ki, Hwaseong-si (KR); Nahyup Kang, Seoul (KR); Kinam Kwon, Suwon-si (KR); Hyong Euk Lee, Suwon-si (KR); Jae Seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 941 days.

(21) Appl. No.: 17/869,165

(22) Filed: Jul. 20, 2022

(65) Prior Publication Data

US 2023/0071693 A1    Mar. 9, 2023

(30) Foreign Application Priority Data

Aug. 31, 2021    (KR) ........................ 10-2021-0115824

(51) Int. Cl.
G06T 5/70 (2024.01)
G06T 5/73 (2024.01)

(52) U.S. Cl.
CPC ................. G06T 5/70 (2024.01); G06T 5/73 (2024.01); *G06T 2207/20081* (2013.01); *G06T 2207/20084* (2013.01)

(58) Field of Classification Search
CPC .... G06T 5/73; G06T 5/60; G06T 5/70; G06T 2207/20081; G06T 2207/20084;
(Continued)

(56) References Cited

U.S. PATENT DOCUMENTS 7,756,407 B2    7/2010  Raskar

FOREIGN PATENT DOCUMENTS

CN    111242870 A     6/2020
CN    113177888 A  *  7/2021    ............. G06N 3/045
(Continued)

OTHER PUBLICATIONS

Wu H, Qu Y, Lin S, Zhou J, Qiao R, Zhang Z, Xie Y, Ma L. Contrastive Learning for Compact Single Image Dehazing. arXiv e-prints. Apr. 19, 2021:arXiv-2104. (Year: 2021).*
Rame A, Cord M. Dice: Diversity in deep ensembles via conditional redundancy adversarial estimation. arXiv preprint arXiv:2101. 05544. Jan. 14, 2021. (Year: 2021).*
(Continued)

*Primary Examiner* — Tracy Mangialaschi
(74) *Attorney, Agent, or Firm* — NSIP Law

(57) ABSTRACT

A processor-implemented method with degraded image restoration includes: receiving a degraded training image; training a first teacher network of an image restoration network and a second teacher network of the image restoration network to infer differential images corresponding to the degraded training image, wherein each of the first teacher network and the second teacher network comprises a differentiable activation layer and a performance of the first teacher network is greater than that of the second teacher network; initially setting a student network of the image restoration network based on the second teacher network; and training the student network to infer a differential image corresponding to the degraded training image by iteratively backpropagating, to the student network, a contrastive loss that decreases a first difference between a third output of the student network and a first output of the first teacher network and increases a second difference between the third output and a second output of the second teacher network.

21 Claims, 11 Drawing Sheets

(58) Field of Classification Search
CPC .... G06N 3/0475; G06N 3/0464; G06N 3/096;
G06N 3/045; G06N 3/084; G06N 3/048
See application file for complete search history.

(56) References Cited

FOREIGN PATENT DOCUMENTS

| CN | 113240580 A | * | 8/2021 | ............ | G06N 3/045 |
| JP | 6587317 B2 | | 9/2019 | | |
| JP | 2020-99627 A2 | | 7/2020 | | |
| KR | 10-2020-0127766 A | | 11/2020 | | |

OTHER PUBLICATIONS

Yang, et al. "Knowledge Distillation with Contrastive Inter-Class Relationship." *Journal of Physics: Conference Series*. vol. 1756. No. 1. p. 012001 IOP Publishing, 2021.

He, et al. "Fakd: Feature-affinity based knowledge distillation for efficient image super-resolution." *2020 IEEE International Conference on Image Processing (ICIP)*. IEEE, 2020. pp. 518-522.

Lee, et al. "Learning with privileged information for efficient image super-resolution." *European Conference on Computer Vision*. Springer, Cham, 2020. pp. 465-482.

Oki, Hideki, et al., "Triplet Loss for Knowledge Distillation", 2020 International Joint Conference on Neural Networks (IJCNN), arXiv:2004.08116v1, Apr. 17, 2020, (7 Pages in English).

Korean Office Action Issued on Feb. 11, 2026, in Counterpart Korean Patent Application No. 10-2021-0115824 (4 Pages in English, 9 Pages in Korean).

* cited by examiner

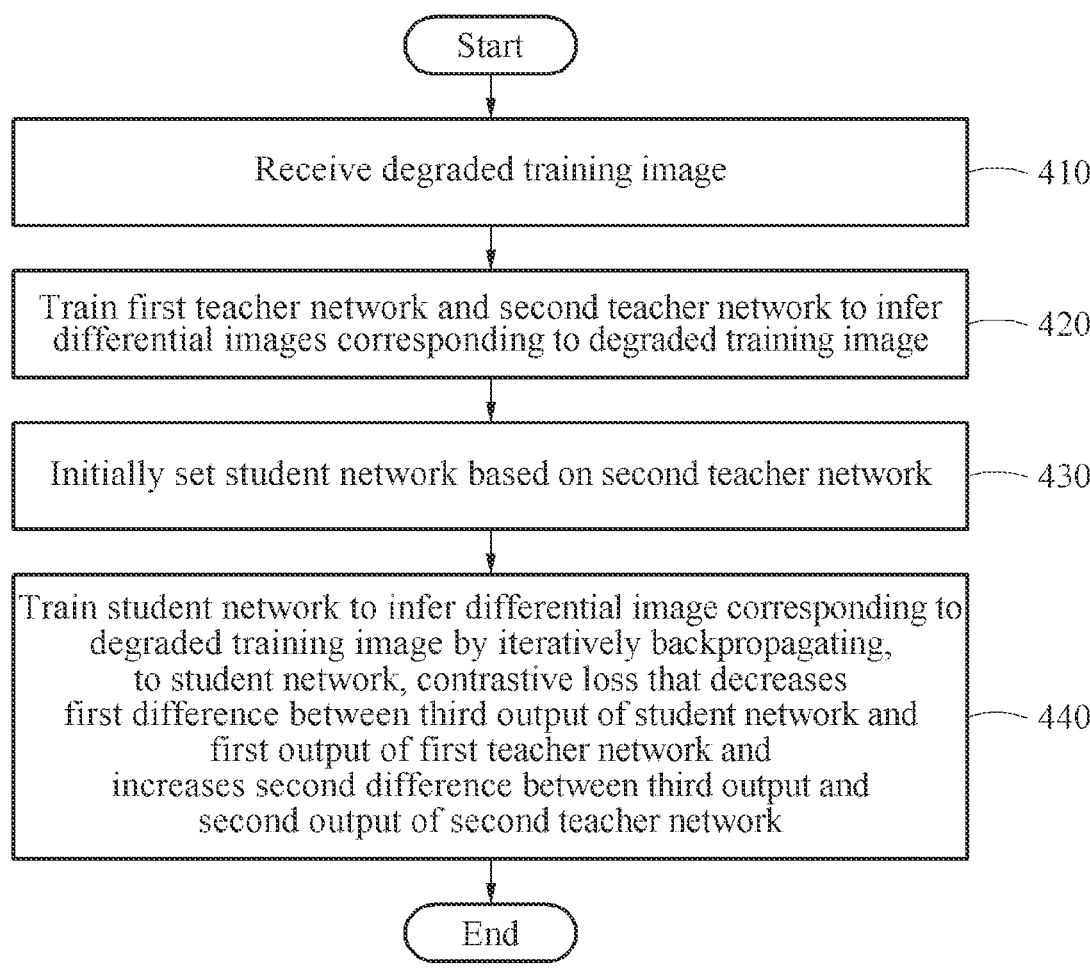

Start

Receive degraded training image —— 410

Train first teacher network and second teacher network to infer differential images corresponding to degraded training image —— 420

Initially set student network based on second teacher network —— 430

Train student network to infer differential image corresponding to degraded training image by iteratively backpropagating, to student network, contrastive loss that decreases first difference between third output of student network and first output of first teacher network and increases second difference between third output and second output of second teacher network —— 440

End

FIG.4

METHOD AND APPARATUS WITH DEGRADED IMAGE RESTORATION

CROSS-REFERENCE TO RELATED APPLICATIONS

This application claims the benefit under 35 USC § 119(a) of Korean Patent Application No. 10-2021-0115824 filed on Aug. 31, 2021 in the Korean Intellectual Property Office, the entire disclosure of which is incorporated herein by reference for all purposes.

BACKGROUND

1. Field

The following description relates to a method and apparatus with degraded image restoration.

2. Description of Related Art

A camera, a device for capturing an image, may be used in various electronic devices. For a mobile device such as a smartphone, a camera may be an essential component, and may be highly advanced in terms of its performance and small size. An image captured by a camera may be degraded or distorted by blur and noise occurring due to various causes, such as, for example, camera movements (e.g., shaking), object movements, out focus, high-sensitivity settings, long exposure, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with degraded image restoration includes: receiving a degraded training image; training a first teacher network of an image restoration network and a second teacher network of the image restoration network to infer differential images corresponding to the degraded training image, wherein each of the first teacher network and the second teacher network comprises a differentiable activation layer and a performance of the first teacher network is greater than that of the second teacher network; initially setting a student network of the image restoration network based on the second teacher network; and training the student network to infer a differential image corresponding to the degraded training image by iteratively backpropagating, to the student network, a contrastive loss that decreases a first difference between a third output of the student network and a first output of the first teacher network and increases a second difference between the third output and a second output of the second teacher network.

The training of the student network may include iteratively backpropagating the contrastive loss to the student network by further applying, to the contrastive loss, a ground truth loss between the first output of the first teacher network and a ground truth corresponding to the degraded training image and one or more high-order derivative losses of a differential inference cost function corresponding to each of the first output and the ground truth.

The first teacher network, the second teacher network, and the student network may be trained based on the same one or more functions having a similar characteristic.

The contrastive loss may include a loss that, by the iterative backpropagation, decreases the first difference determined for each channel of the third output and the first output and increases the second difference determined for each channel of the third output and the second output.

The training of the student network may include iteratively backpropagating the contrastive loss to the student network by further applying, to the contrastive loss, either one or both of: a first loss that decreases a first difference between the third output and a deblurred first output of a first deblurring teacher network identifying a blurred region corresponding to degradation information of each region of the degraded training image and increases a second difference between the third output and a deblurred second output of a second deblurring teacher network identifying the blurred region; and a second loss that decreases a third difference between the third output and a denoised first output of a first denoising teacher network identifying a noisy region corresponding to degradation information of each region of the degraded training image and increases a fourth difference between the third output and a denoised second output of a second denoising teacher network identifying the noisy region.

The degradation information may include either one or both of noise and blur.

The training of the student network may include iteratively backpropagating the contrastive loss to the student network by further applying, to the contrastive loss, a first adversarial loss that is based on a degree of discrimination between the degraded training image and a backpropagated image obtained by backpropagating a first restored image generated by the student network based on the degraded training image and a second adversarial loss that is based on a degree of discrimination between a ground truth image corresponding to the degraded training image and a second restored image generated by the student network by backpropagating the ground truth image.

The image restoration network further may include: a first discriminator configured to determine a difference between the degraded training image and the backpropagated image of the first restored image; a second discriminator configured to determine a difference between the ground truth image and the second restored image; and a backward network configured to backpropagate the first restored image or the ground truth image.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with degraded image restoration includes: obtaining a generative network comprising a differentiable activation layer; applying a learnable parameter to the generative network; receiving a degraded image; generating a restored image in which degradation information of the degraded image is restored by inputting the degraded image to the generative network to which the learnable parameter is applied; and outputting the restored image.

The differentiable activation layer may correspond to the following equation, and may be implemented by an exponential linear unit (ELU) activation layer comprising a second learnable parameter $\alpha$, Equation:

$$ELU(x) = \begin{cases} x, & \text{if } x > 0 \\ \alpha*(\exp(x)-1), & \text{if } x \leq 0 \end{cases}.$$

The differentiable activation function may correspond to the following equation, and may be implemented by a softplus activation layer comprising a second learnable parameter $\beta$, Equation:

$$\text{Softplus } (x) = \frac{1}{\beta} * \log(1 + \exp(\beta * x)).$$

The learnable parameter may include either one or both of: a first parameter of a convolution layer comprised in the generative network; and a second parameter of the differential activation layer.

The generative network may be trained based on a contrastive loss that, by iterative backpropagation, decreases a first difference between a first output of a first teacher network and a third output of the generative network and increases a second difference between the third output and a second output of a second teacher network having performance lower than that of the first teacher network, and the first teacher network and the second teacher network each may include a differentiable activation layer, and are pretrained to infer differential images corresponding to the degraded image.

The degrade image may be captured by an under-display camera (UDC).

In another general aspect, a non-transitory computer-readable storage medium may store instructions that, when executed by one or more processors, configure the one or more processors to generate a degraded image restorer, comprising a generative network comprising a differentiable activation layer, by performing the following operations, for the generative network, wherein the operations comprise: obtaining a degraded training image; preparing a first teacher network and a second teacher network, wherein each of the first teacher network and the second teacher network may include a differentiable activation layer and is pretrained to restore the degraded training image, and a performance of the first teacher network is greater than that of the second teacher network; initially setting a student network based on the second teacher network; iteratively backpropagating, to the student network, a contrastive loss obtained from a loss function to update the generative network, wherein the contrastive loss is a loss that decreases a first difference between a third output of the student network and a first output of the first teacher network and increases a second difference between the third output and a second output of the second teacher network; stopping the backpropagating when the loss function satisfies preset criteria; and storing a set of parameters associated with the generative network in the non-transitory computer-readable storage medium.

In another general aspect, an electronic device includes: one or more processors configured to: invoke a generative network comprising a differentiable activation layer; apply a learnable parameter to the generative network; and generate a restored image in which degradation information of a degraded image is restored by inputting the degraded image to the generative network to which the learnable parameter is applied.

The electronic device may include: a communication interface configured to receive the degraded image; and a display configured to output the restored image.

The differentiable activation layer may correspond to the following equation, and may be implemented by an exponential linear unit (ELU) activation layer comprising a second learnable parameter $\alpha$, Equation:

$$ELU(x) = \begin{cases} x, & \text{if } x > 0 \\ \alpha*(\exp(x)-1), & \text{if } x \leq 0 \end{cases}.$$

The differentiable activation layer may correspond to the following equation, and may be implemented by a softplus activation layer comprising a second learnable parameter $\beta$, Equation:

$$\text{Softplus } (x) = \frac{1}{\beta} * \log(1 + \exp(\beta * x)).$$

The learnable parameter may include either one or both of: a first parameter of a convolution layer comprised in the generative network; and a second parameter of the differentiable activation layer.

The electronic device may include a memory storing instructions that, when executed by the one or more processors, configure the one or more processors to perform the invoking of the generative network, the applying of the learnable parameter, and the generating of the restored image.

In another general aspect, a processor-implemented method with degraded image restoration may include: initially setting a student network based on a second teacher network; and training the student network to infer a differential image corresponding to a degraded training image by iteratively backpropagating, to the student network, a contrastive loss that decreases a first difference between a third output of the student network and a first output of a first teacher network and increases a second difference between the third output and a second output of the second teacher network, wherein a depth of the trained student network is less than a depth of the first teacher network and is greater than or equal to a depth of the second teacher network.

Each of the first teacher network and the second teacher network may include either one or both of: a deblurring teacher network configured to identify a blurred region of the degraded training image; and a denoising teacher network configured to identify a noisy region of the degraded training image.

Other features and aspects will be apparent from the following detailed description, the drawings, and the claims.

BRIEF DESCRIPTION OF THE DRAWINGS

FIG. 4 illustrates an example of a method of training an image restoration network.

Figure 1:
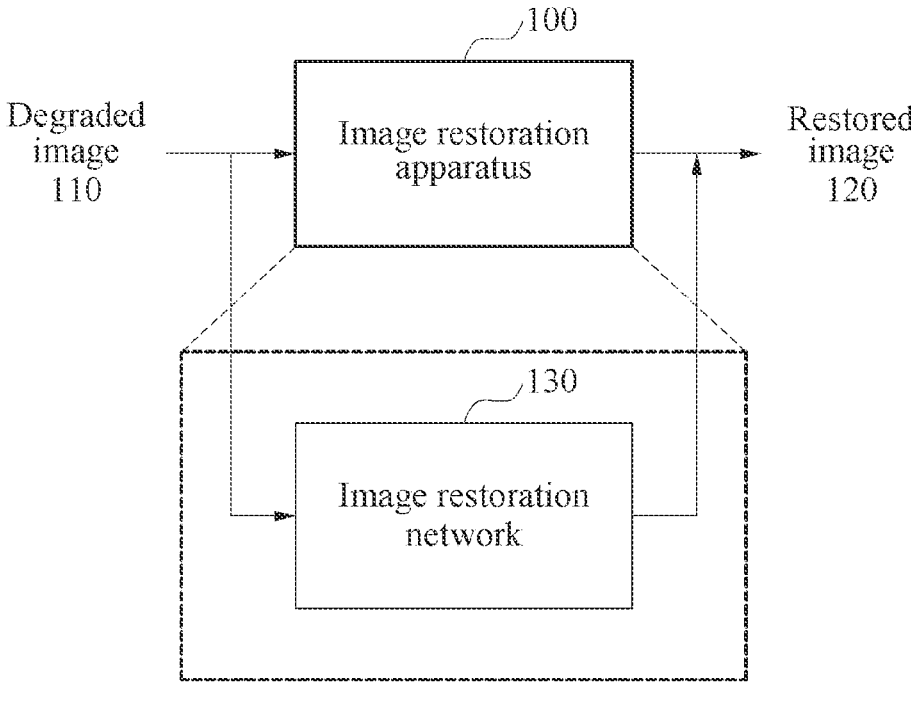
FIG. 1 illustrates an example of restoring a degraded image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "comprises," "includes," and "has" specify the presence of stated integers, steps, features, numbers, operations, members, elements, and/or combinations thereof, but do not preclude the presence or addition of one or more other integers, steps, features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when an element, such as a layer, region, or substrate, is described as being "on," "connected to," or "coupled to" the other element, it may be directly "on," "connected to," or "coupled to" the other component, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of restoring a degraded image. Referring to FIG. 1, an image restoration apparatus 100 of one or more embodiments may generate a restored image 120 by removing image quality degrading factors and/or restoring degradation information of a degraded image 110 through image restoration. The image restoration apparatus 100 may restore the degradation information based on degradation information specific to the degraded image 110 and/or degradation information of each region of the degraded image 110. The degraded image 110 may be an image obtained from an under-display camera (UDC), but is not necessarily limited thereto.

The image restoration apparatus 100 may include an image restoration network 130. The image restoration network 130 may be implemented as a neural network, such as, for example, any one or any combination of any two or more of a deep neural network (DNN), a fully-connected network (FCN), a convolutional neural network (CNN), and a recurrent neural network (RNN), which includes a plurality of layers, but examples of which are not limited thereto.

A portion of (e.g., one or more) layers in the image restoration network 130 may correspond to a CNN and another portion of the layers may correspond to an FCN. In an example, the CNN may also be referred to herein as a convolution layer, and the FCN may also be referred to herein as a fully-connected layer.

In a case of the CNN, data input to each layer of the CNN may be referred to as an input feature map, and data output from each layer may be referred to as an output feature map. The input feature map and the output feature map may be collectively referred to as activation data. For example, in a case in which the convolution layer is an input layer, the input feature map of the input layer may be an input image.

When the neural network is trained based on deep learning, the neural network may map input data and output data that are in a nonlinear relationship to perform an inference suitable for a purpose of training.

Deep learning may be a machine learning method used to solve a task such as image or speech recognition from a big dataset. Deep learning may be construed as an optimization problem-solving process for finding a point at which energy is minimized while training the neural network using prepared training data. Deep learning may include supervised or unsupervised learning, through which an architecture of the neural network or a weight corresponding to a model may be obtained. Through the weight, the input data and the output data may be mapped to each other. When a width and depth of the neural network are sufficiently large, the neural network may have a capacity sufficient to implement a function. When the neural network learns a sufficiently great amount of training data through a suitable training process, an optimal performance may be achieved.

The neural network may be described herein as being trained "in advance." Such an expression may indicate "before" the neural network begins. That the neural network begins may indicate that the neural network is ready for an inference. For example, that the neural network begins may include a state in which the neural network is loaded in a memory or input data for the inference is input to the neural network when the neural network is loaded in the memory.

The image restoration apparatus 100 may determine degradation information indicating a degrading factor of the degraded image 110 and execute the image restoration network 130 using the degraded image 110 and the degradation information to generate the restored image 120. The degradation information may include, for example, either one or both of a noise parameter indicating a noise distortion of the degraded image 110 and a blur parameter indicating a blur distortion of the degraded image 110. When the image restoration network 130 is executed, the image restoration network 130 may start an inference.

In an example, the image restoration network 130 may include a differentiable activation layer, such as, for example, an exponential linear unit (ELU), a SWISH, and/or a scaled exponential linear unit (SELU). For example, results from the neural network using a convolution layer and a rectified linear unit (ReLU) layer may not explicitly indicate results of a first-order derivative and a high-order derivative such as second-order and third-order derivatives. An inexplicit result of a high-order derivative may indicate that, for example, high-frequency detailed information such as an edge region, a texture region, and hair is lost in a final result image, and texture information is not desirably restored. The image restoration network 130 may use the differentiable activation layer (a differentiable activation layer 320 of FIG. 3, as a non-limiting example) such that the high-frequency detailed information is maintained in the restored image 120.

In addition, the image restoration network 130 may be trained by contrastive knowledge distillation (CKD), for example. The image restoration network 130 may be trained using both a high-performance teacher network (hereinafter, a "first teacher network") and a low-performance teacher network (hereinafter, a "second teacher network"). In an example, a high performance and a low performance respectively of the high-performance teacher network and the low-performance teacher network may be classified by a difference in accuracy that is substantially expected from the respective networks. In general, a performance of a network may be determined based on a depth and/or size of the network. For example, when the network is deep in depth and large in size, the network may correspond to a high-performance network. In contrast, when the network is shallow in depth and small in size, the network may correspond to a low-performance network.

The first teacher network may represent a true network and the second teacher network may represent a false network.

A depth or size of the second teacher network may be less than or equal to a depth or size of a student network. The image restoration network 130 may correspond to the student network (a student network 240 of FIG. 2B, as a non-limiting example) that is trained to be similar to the first teacher network (a first teacher network 220 of FIG. 220, as a non-limiting example) and is trained simultaneously to be different from the second teacher network (a second teacher network 230 of FIG. 2B, as a non-limiting example).

The image restoration network 130 may have a depth that is less than that of the first teacher network and is greater or equal to that of the second teacher network, through or as a result of the training by the CKD. A depth of a network described herein may represent the number of layers included in the network, e.g., the number of basic blocks. Thus, a great depth of a network (deep) may indicate that the number of layers included in the network is great (e.g., the number of basic blocks included in the network is great) and may be construed that the size of the network is great or a performance of the network is high. In contrast, a small depth of a network (shallow) may indicate that the number of layers included in the network is small (e.g., the number of basic blocks included in the network is small) and may be construed that the size of the network is small or a performance of the network is low.

The image restoration network 130 may be trained to have a high performance as the first teacher network has, yet to have a small size as the second teacher network has, through the CKD. The image restoration network 130 may correspond to the student network or a generative network to be described hereinafter.

In an example, the image restoration apparatus 100 may generate the restored image 120 by inputting the degraded image 110 as input data to the image restoration network 130. Alternatively or additionally, the image restoration apparatus 100 may generate the restored image 120 by inputting the degraded image 110 as input data to the image restoration network 130 and adjusting an output of a layer of the image restoration network 130 by a learnable parameter. A non-limiting example of a method of training the image restoration network 130 will be described hereinafter with reference to FIGS. 2A and 2B.

Figure 2A:
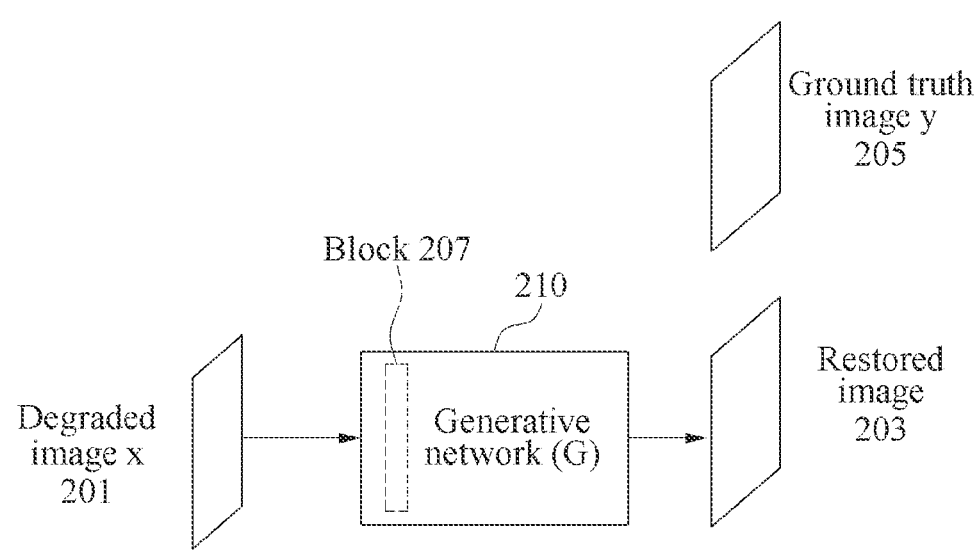
FIGS. 2A and 2B illustrate an example of an architecture and a training process of a generative network.
Figure 2B:
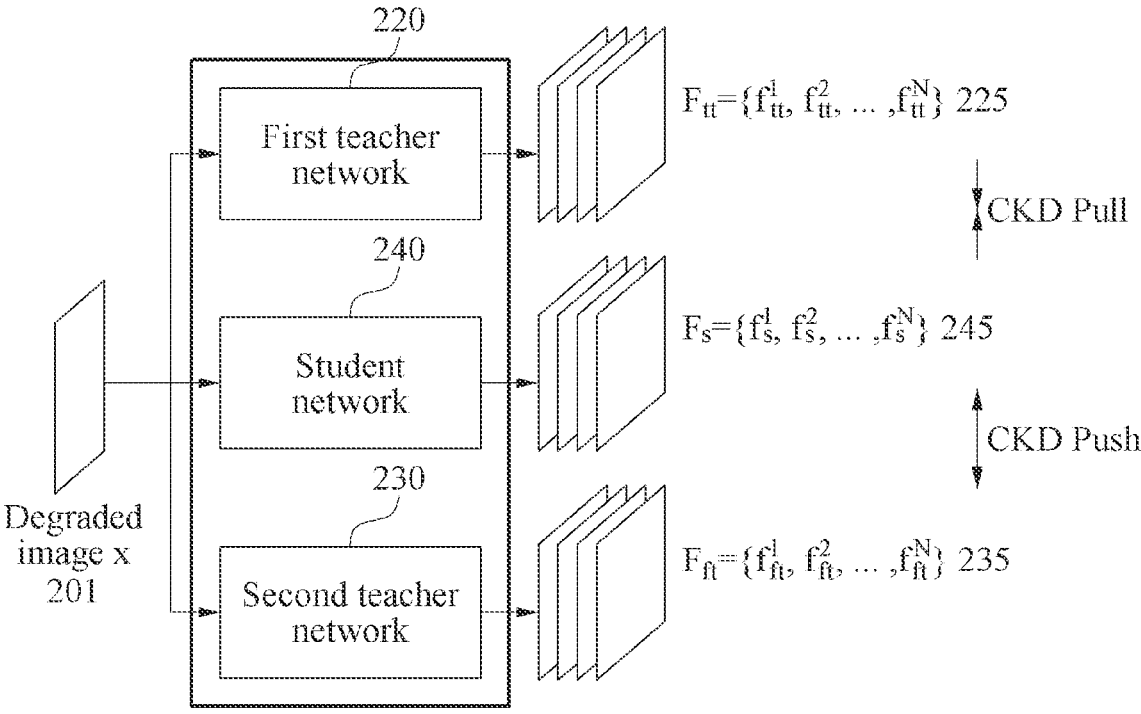

FIGS. 2A and 2B illustrate an example of an architecture and a training process of a generative network. Referring to FIG. 2A, illustrated is an architecture of a generative network G 210.

For example, when a degraded image x 201 is input to the generative network G 210, a restored image 203 in which a degrading factor of the degraded image x 201 is restored may be generated. The generative network G 210 may include a differentiable activation layer (a differentiable activation layer 320 of FIG. 3, as a non-limiting example) to restore a high-frequency detailed component. A non-limiting example of an architecture of a block 207 of layers included in the generative network G 210 will be described hereinafter with reference to FIG. 3.

The generative network G 210 may be trained to infer a ground truth image y 205 and also a differential value of the ground truth image y 205. The differential value may be represented in the form of a high-order derivative.

For example, the generative network G 210 may be trained based further on high-order derivative losses $\mathcal{L}_\nabla$ that are based on a differential inference cost function, in addition to a ground truth loss (e.g., $\mathcal{L}_{GT}=\|G(x)-y\|$) between the ground truth image y 205 and the restored image G(x) 203 generated by inputting the degraded image x 201 to the generative network G 210.

For example, a loss function $\mathcal{L}$ used to train the generative network G 210 may be represented by Equation 1 below, for example.

Equation 1:

$$\mathcal{L} = \mathcal{L}_{GT} + \mathcal{L}_\nabla + \mathcal{L}_\Delta + \ldots$$

$$= \|G(x) - y\| + \|\nabla G(x) - \nabla y\| + \|\Delta G(x) - \Delta y\| + \ldots$$

In Equation 1, x denotes a degraded image (e.g., the degraded image x 201), and y denotes a ground truth (GT) image corresponding to the degraded image. In addition, G denotes a generative network (e.g., the generative network G 210).

$\mathcal{L}_\nabla$ denotes a first-order derivative value of each of the restored image G(x) 203 and the ground truth image y 205, and $\mathcal{L}_\nabla$ denotes a second-order derivative value of each of the restored image G(x) 203 and the ground truth image y 205. High-order derivative losses such as $\mathcal{L}_\nabla$ and $\mathcal{L}_\nabla$ that occur through a differential equation may also be referred to as a differential inference cost function.

The high-order derivative losses may include, for example, a gradient loss corresponding to the first-order derivative value $\mathcal{L}_\nabla=\|\nabla G(x)-\nabla y\|$ and a Laplacian loss corresponding to the second-order derivative value $\mathcal{L}_\nabla=\|\nabla G(x)-\nabla y\|$. In addition, the high-order derivative losses may include a third-order derivative value and a fourth-order derivative value. In an example, the generative network G 210 may be trained to infer differential images using the differential inference cost function for training or learning.

For example, when the generative network G 210 includes a ReLU activation layer, detailed information corresponding to a high-frequency component may be lost during a differential. Thus, the generative network G 210 may form an activation function by a differentiable function to infer a derivative value.

Referring to FIG. 2B, illustrated are a first teacher network 220, a second teacher network 230, and a student network 240, which perform CKD.

The first teacher network 220, the second teacher network 230, and the student network 240 may each include a differentiable activation layer, and may be trained in advance to infer differential images corresponding to a degraded image 201 to restore the degraded image 201. The first teacher network 220 may be a high-performance teacher network configured to output a result close to a true result. The first teacher network 220 may also be referred to as a true teacher network (TTN). The second teacher network 230 may be a low-performance teacher network configured to output a result close to a false result. The second teacher network 230 may also be referred to as a false teacher network (FTN).

The first teacher network 220 may be deeper than the second teacher network 230 in depth. The second teacher network 230 may be shallower than or equal to the student network 240 in depth.

In general knowledge distillation (KD), a student network may be trained to follow an inference result of a high-performance teacher network, and a performance of the student network may thereby be improved.

In an example of one or more embodiments, in addition to the first teacher network 220 of a high performance, the second teacher network 230 of a performance less than or equal to that of the student network 240 may also be used for training, and the training may be performed such that an inference result of the student network 240 is similar to (or closer to) an inference result of the first teacher network 220 and different from (or far from) an inference result of the second teacher network 230. This training may also be referred to as CKD.

Through the CKD, the student network 240 having a similar size to that of the second teacher network 230 may have the performance of or similar to the first teacher network 220, and may become lightweight as a result.

A loss for training based on the CKD may be represented by Equation 2 below, for example.

$$\mathcal{L}_{CKD} = \sum_{i=0}^{N} \max\left(0, D\left(f_{tt}^i, f_s^i\right) - D\left(f_s^i, f_{ft}^i\right) + m\right) \qquad \text{Equation 2}$$

In Equation 2, D(.) may correspond to a distance metric, $$f_{tt}^i$$

may correspond to ith data 225 output from a first teacher network or a true teacher network (e.g., the first teacher network 220), $$f_{ft}^i$$

may correspond to ith data 235 output from a second teacher network or a false teacher network (e.g., the second teacher network 230), and $$f_s^i$$

may correspond to ith data 245 output from a student network (e.g., the student network 240). In addition, m denotes a margin. For example, data output from each network may be in the form of a feature map, but is not limited thereto.

The loss $\mathcal{L}_{CKD}$ calculated (e.g., determined) through Equation 2 may be referred to as a triplet loss in that it is a loss among three networks, or as a contrastive loss in that it is based on the CKD.

In Equation 2, the contrastive loss $\mathcal{L}_{CKD}$ may correspond to a loss that, through training, decreases a first difference $$D\left(f_{tt}^i, f_s^i\right)$$

between the first output $$f_{tt}^i$$

225 of the first teacher network 220 and the third output $$f_s^i$$

245 of the student network 240 and increases a second difference $$D\left(f_s^i, f_{ft}^i\right)$$

between the third output $$f_s^i$$

245 of the student network 240 and the second output $$f_{ft}^i$$

235 of the second teacher network 230. For example, the contrastive loss $\mathcal{L}_{CKD}$ may correspond to a loss that, through training, results in the first difference $$D\left(f_{tt}^i, f_s^i\right)$$

being smaller than the second difference $$D\left(f_s^i, f_{ft}^i\right).$$

In Equation 2, the distance metric D(•) may not be a general Euclidean distance, but rather a distance measured between channels having a minimum distance for each channel of the teacher networks (e.g., the first teacher network 220 and the second teacher network 230) and the student network 240.

An order between the channels when measuring the distance between the output data 225 and 235 of the teacher networks (e.g., the first teacher network 220 and the second teacher network 230) and the output data 245 of the student network 240 may not be consistent. In an example, instead of using the general Euclidean distance such as L2 norm and L1 norm, measuring the distance between the channels having the minimum distance for each channel of the teacher networks (e.g., the first teacher network 220 and the second teacher network 230) and the student network 240 may enable the measurement of a significant distance even when the channel order changes due to a different training process despite similar output data (e.g., feature maps).

For example, the contrastive loss may be a loss such that, as a result of the training, the first difference calculated for each channel of each of the third output $$f_s^i$$

245 and the first output $$f_{tt}^i$$

225 is smaller than the second difference calculated for each channel of each of the third output $$f_s^i$$

245 and the second output $$f_{ft}^i$$

235.

The first teacher network 220, the second teacher network 230, and the student network 240 that perform the CKD may be trained using the same function or functions having a similar characteristic. For example, when the first teacher network 220, the second teacher network 230, and the student network 240 that perform the CKD use functions having different function characteristics (such as, for example, an ELU and a ReLU), training may not be desirably performed. The different function characteristics may include, for example, whether a function is differentiable and/or whether information having a value less than 0 is maintained or not.

In an example, during an inference performed using the student network 240 trained through the process described above, a learnable parameter may be applied to the differentiable activation layer included in the student network 240 such that the differentiable activation layer may be transformed to be desirable to improve the performance of the student network 240.

In an example, the differentiable activation layer, the high-order derivative loss, and the CKD of one or more embodiments may enable the acquisition of an image having a significantly improved image quality even for a small-sized network operating in real time in a mobile device.

Figure 3:
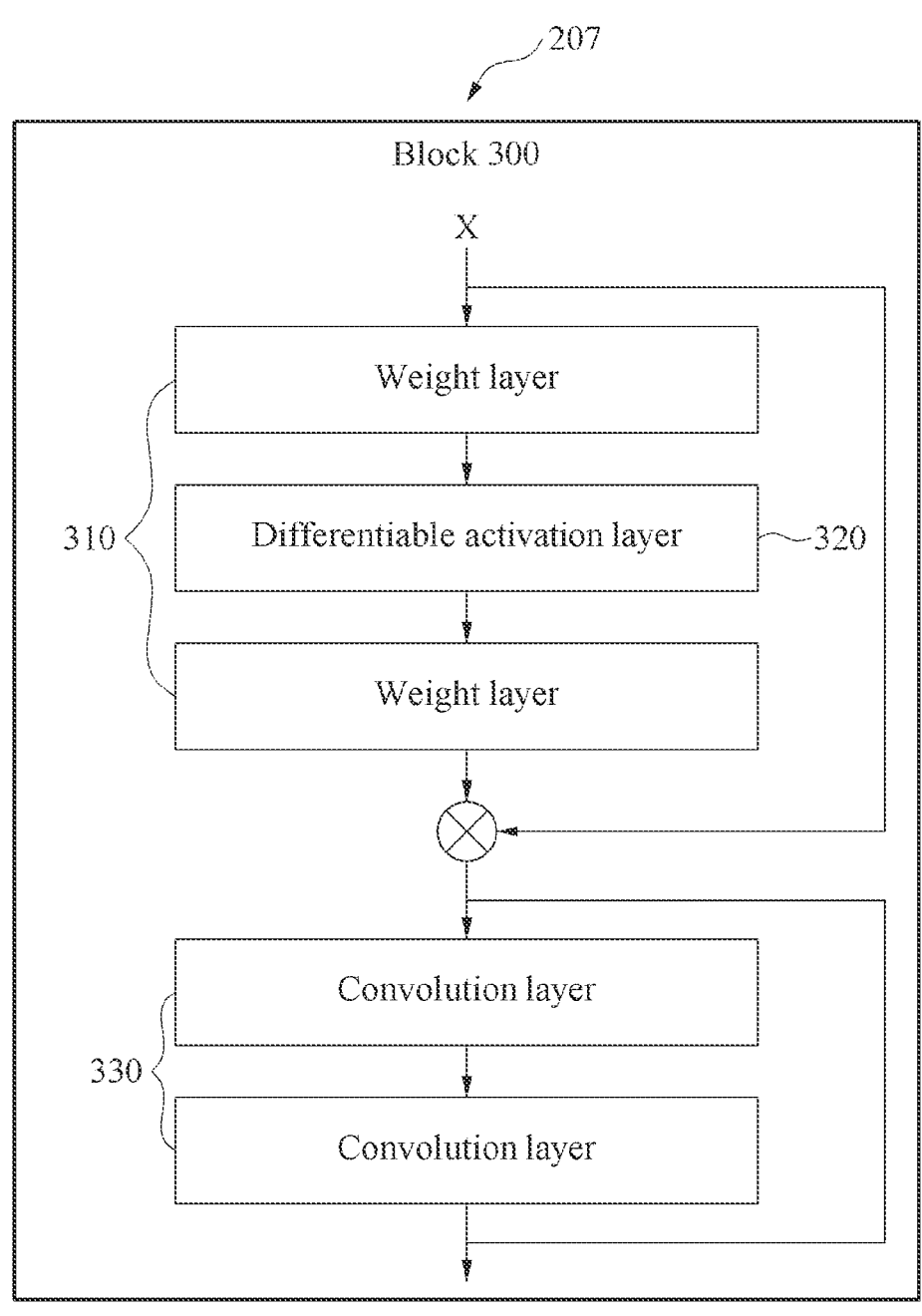
FIG. 3 illustrates an example of a configuration of a basic block of a generative network.

FIG. 3 illustrates an example of a configuration of a basic block of a generative network. Referring to FIG. 3, a basic block 300 may include one or more weight layers 310, a differentiable activation layer 320, and convolution layers 330.

The basic block 300 may further include the differentiable activation layer 320 of a ResNet-based structure that is used for image processing.

The one or more weight layers 310 may include all types of layers that act on a feature map using a filter, such as, for example, an FCN and/or a CNN.

The differentiable activation layer 320 may include all differentiable types of functions, such as, for example, an ELU, a SWISH, a SELU, and/or a softplus, among nonlinearity functions, but examples of which are not limited thereto.

FIG. 4 illustrates an example of a method of training an image restoration network. Referring to FIG. 4, a training apparatus may train an image restoration network including a first teacher network, a second teacher network, and a student network through operations 410 through 440 to be described hereinafter.

The first teacher network, the second teacher network, and the student network may be trained based on the same function or functions having a similar characteristic.

In operation 410, the training apparatus may receive a degraded training image. The degraded training image may be, for example, an image degraded or distorted by either one or both of blur and noise, but is not limited thereto.

In operation 420, the training apparatus may train the first teacher network and the second teacher network to infer differential images corresponding to the degraded training image received in operation 410. In an example, each of the first teacher network and the second teacher network may include a differentiable activation layer. In addition, a performance of the first teacher network may be greater than a performance of the second teacher network.

In operation 430, the training apparatus may initially set the student network based on the second teacher network trained in operation 420. The initial setting of the student network may indicate setting an initial value such that the student network has the same weight as that of the second teacher network, and/or may be construed as generating the student network by reproducing (or replicating) the second teacher network.

In operation 440, the training apparatus may train the student network to infer a differential image corresponding to the degraded training image by iteratively backpropagating, to the student network initially set in operation 430, a contrastive loss that decreases a first difference between a third output of the student network and a first output of the first teacher network and increases a second difference between the third output and a second output of the second teacher network. The contrastive loss may correspond to a loss that satisfies Equation 2 described above, for example. In addition, the contrastive loss may include a loss that decreases the first difference calculated for each channel of each of the third output and the first output and increases the second difference calculated for each channel of each of the third output and the second output.

For example, the training apparatus may iteratively backpropagate the contrastive loss to the student network by further applying, to the contrastive loss, a ground truth (or GT) loss between the first output of the first teacher network and a ground truth corresponding to the degraded training image and one or more high-order derivative losses of a differential inference cost function corresponding to each of the first output and the ground truth.

For example, in operation 440, the training apparatus may iteratively backpropagate the contrastive loss to the student network by further applying, to the contrastive loss, either one or both of a first loss that, through the iterative backpropagation, decreases a first difference between the third output and a deblurred first output of a first deblurring teacher network (e.g., the first teacher network) configured to identify a blurred region corresponding to degradation information for each region of the degraded training image and increases a second difference between the third output and a deblurred second output of a second deblurring teacher network (e.g., the second teacher network) configured to identify the blurred region, and of a second loss that, through the iterative backpropagation, decreases a third difference between the third output and a denoised first output of a first denoising teacher network (e.g., the first teacher network) configured to identify a noisy region corresponding to degradation information for each region of the degraded training image and increases a fourth difference between the third output and a denoised second output of a second denoising teacher network (e.g., the second teacher network) configured to identify the noisy region. A non-limiting example of the iterative backpropagating to the student network by further applying either one or both of the first loss and the second loss to the contrastive loss will be described in detail with reference to FIG. 5. The degradation information may include either one or both of noise and blur, for example.

In an example, the training apparatus may iteratively backpropagate the contrastive loss to the student network by further applying, to the contrastive loss, a first adversarial loss that is based on a degree of discrimination between the degraded training image and a backpropagated image obtained by backpropagating a first restored image generated by the student network based on the degraded training image and a second adversarial loss that is based on a degree of discrimination between a ground truth image corresponding to the degraded training image and a second restored image generated by the student network by backpropagating the ground truth image.

In this example, the image restoration network may further include a cyclic generative adversarial network (GAN) including a first discriminator configured to determine a difference between the degraded training image and the backpropagated image of the first restored image, a second discriminator configured to determine a difference between the ground truth image and the second restored image, and a backward network configured to backpropagate the first restored image or the ground truth image. The cyclic GAN may be used to maintain a restoration performance for all degrading factors, to restore a multi-degraded image in which noise and blur are mixed. A non-limiting example of an architecture and path of the cyclic GAN will be described hereinafter with reference to FIG. 6.

Figure 5:
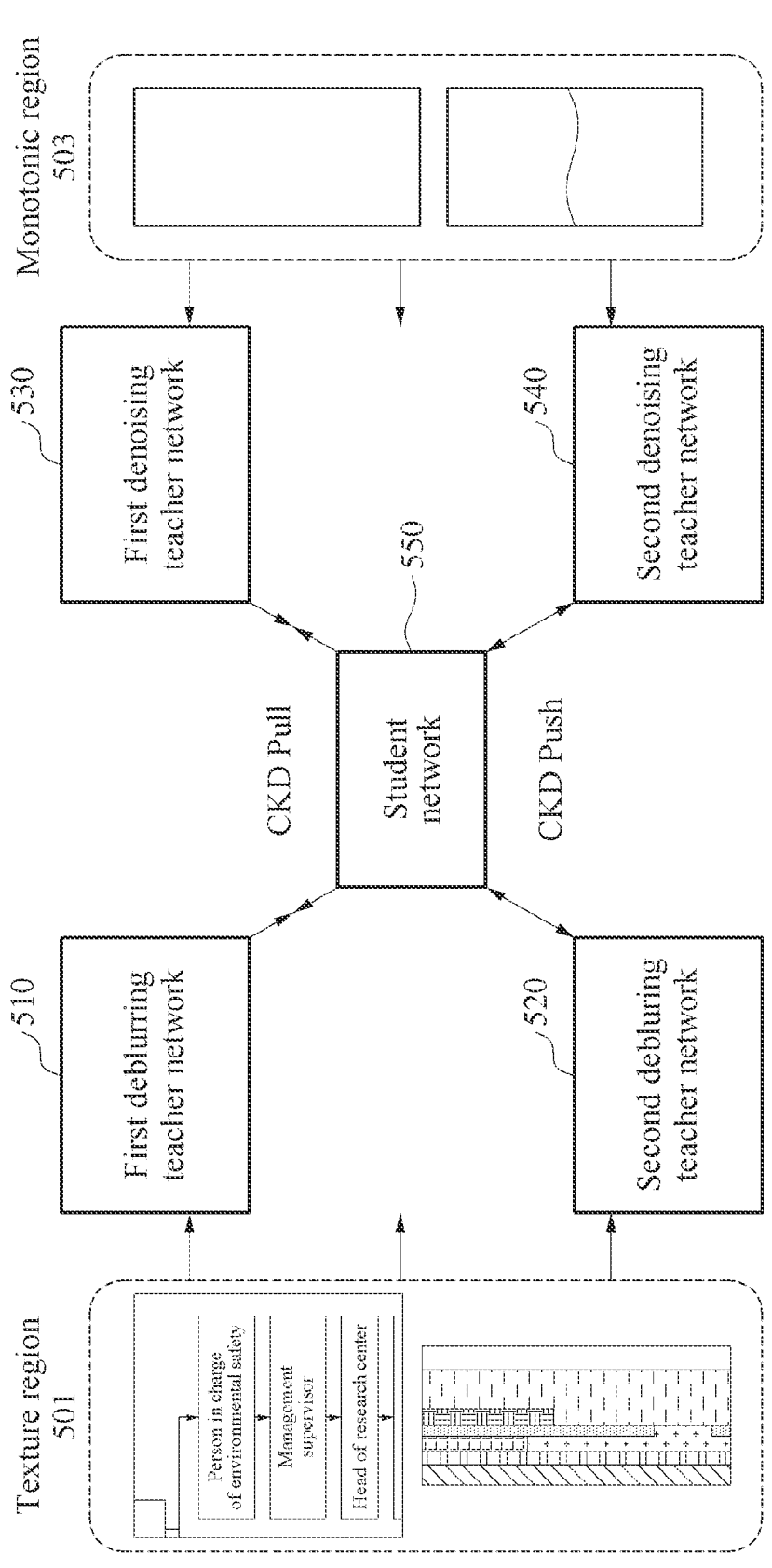
FIG. 5 illustrates an example of restoring a degraded image.

FIG. 5 illustrates an example of restoring a degraded image. Referring to FIG. 5, illustrated are a texture region 501 and a monotonic region 503 that are included in a portion of a degraded image, a first deblurring teacher network 510, a second deblurring teacher network 520, a first denoising teacher network 530, a second denoising teacher network 540, and a student network 550.

In an example, for restoring a multi-degraded image distorted by noise and blur, CKD classified for each region of the degraded image may be employed.

For example, in a case in which an image captured by a UDC has a mixture of degradation information (e.g., noise and blur) having a complementary characteristic, applying the CKD to a teacher network optimized for each type of degradation information corresponding to a region mainly affected by each degradation information may improve a performance in restoring a distortion in the corresponding region. A non-limiting example of the UDC will be described in detail with reference to FIGS. 9 and 10.

In an example, the student network 550 may be trained using the teacher networks 510, 520, 530, and 540 optimized for degradation information corresponding to each region in an input image.

For example, blur may greatly affect the texture region 501 having a great color or texture change. Thus, in the texture region 501, CKD-based training may be performed using a pair including the first deblurring teacher network 510 of a high performance that is optimized for a blur distortion and the second deblurring teacher network 520 of a low performance for the blur distortion. For example, the first deblurring teacher network 510 and the second deblurring teacher network 520 may identify a blurred region corresponding to degradation information for each region of a degraded training image.

Further, noise may greatly affect the monotonic region 503 having a lesser color or texture change. Thus, in the monotonic region 503, CKD-based training may be performed using a pair including the first denoising teacher network 530 of a high performance optimized for a noise distortion and the second denoising teacher network 540 of a low performance for the noise distortion. For example, the first denoising teacher network 530 and the second denoising teacher network 540 may identify a noisy region corresponding to degradation information for each region of the degraded training image.

A degraded image restorer may iteratively backpropagate a contrastive loss to the student network 550 by further applying, to the contrastive loss, either one or both of a first loss that, by the iterative backpropagation, decreases a first difference between a third output of the student network 550 and a first deblurred output of the first deblurring teacher network 510 and increases a second difference between the third output of the student network 550 and a second deblurred output of the second deblurring teacher network 520, and a second loss that, by the iterative backpropagation, decreases a third difference between the third output of the student network 550 and a first denoised output of the first denoising teacher network 530 and increases a fourth difference between the third output of the student network 550 and a second denoised output of the second denoising teacher network 540.

For example, the student network 550 may be trained by further applying, to the contrastive loss, either one or both of the first loss and the second loss corresponding to each region of the input image.

Figure 6:
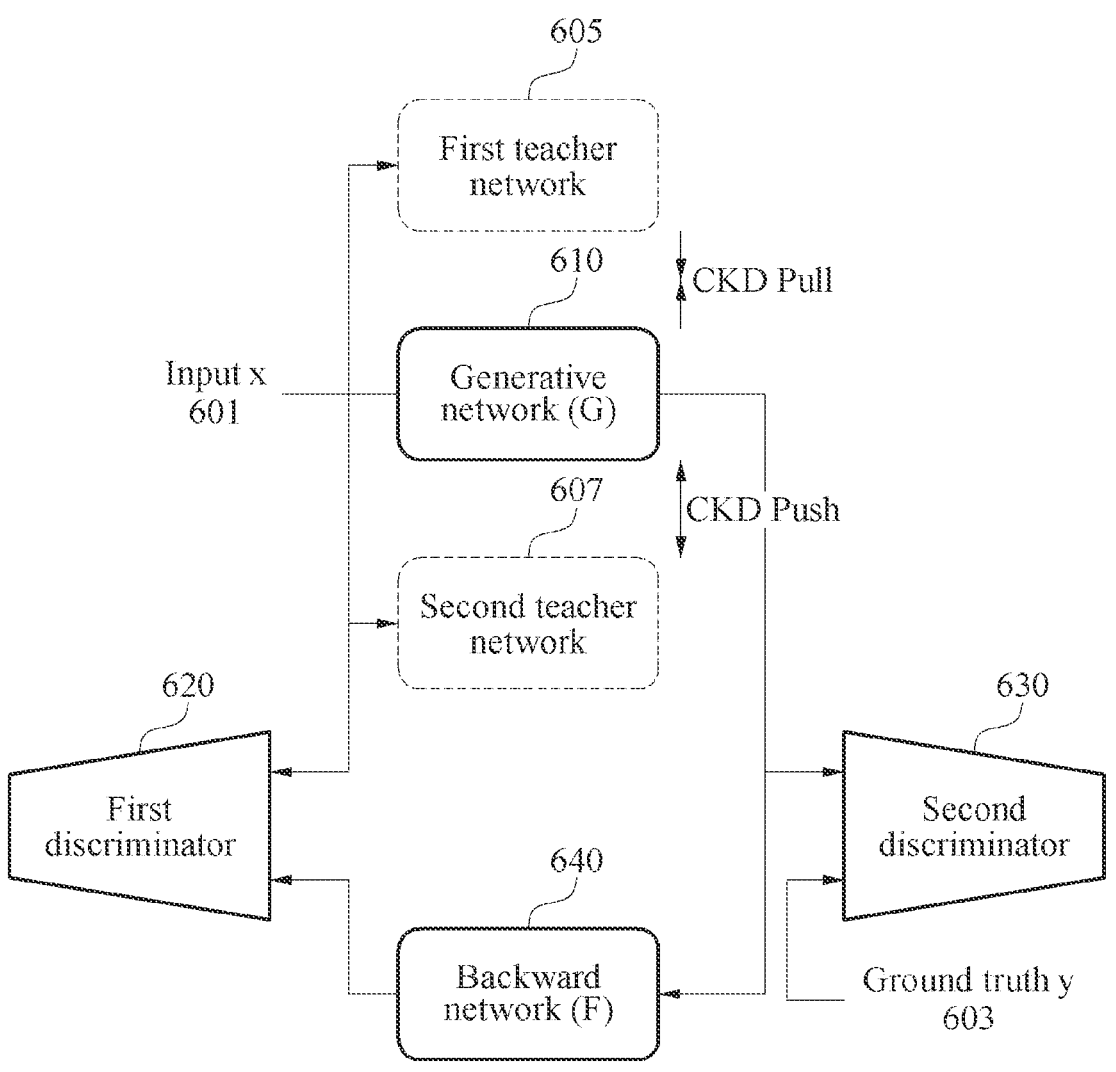
FIG. 6 illustrates an example of training a generative network by a cyclic generative adversarial network (GAN).

FIG. 6 illustrates an example of training a generative network by a cyclic GAN. Referring to FIG. 6, illustrated is an architecture of a cyclic GAN including a first teacher network 605, a second teacher network 607, a generative network G 610, a first discriminator 620, a second discriminator 630, and a backward network F 640.

When CKD is used to restore a degraded image in which multiple distortions including noise and blur occur, a path of the cyclic GAN may be added such that the teacher networks 605 and 607 maintain a restoration performance for all the distortions.

The discriminators 620 and 630 present on the path of the cyclic GAN may determine a difference between an output image of the generative network G 610 and a ground truth image y 603 based on an overall distribution of image data of a degraded training image x 601, and may backpropagate information to a network such that the output image of the generative network G 610 follows a distribution of the ground truth image y 603.

For example, the generative network G 610 may correspond to a student network trained by the first teacher network 605 and the second teacher network 607 through the CKD described above. The generative network G 610 may receive, as an input, the degraded training image x 601, and generate a first restored image G(x). An image restored by the generative network G 610 (for example, the first restored image G(x)) may also be referred to as a synthetic image.

The first discriminator 620 may determine a difference between the degraded training image x 601 and a backpropagated image F(G(x)) obtained by backpropagating the first restored image G(x) generated by the generative network G 610 based on the degraded training image x 601 through the backward network F 640. For example, the first discriminator 620 may output "1" or "true" for the degraded training image x 601 and output "0" or "false" for the backpropagated image F(G(x)) of the first restored image G(x).

The second discriminator 630 may determine a difference between the ground truth image y 603 and a second restored image G(F(y)) generated by the generative network G 610 by backpropagating the ground truth image y 603 corresponding to the degraded training image x 601 through the backward network F 640. For example, the second discriminator 630 may output "1" or "true" for the ground truth image y 603 and output "0" or "false" for the second restored image G(F(y)).

The backward network F 640 may backpropagate the first restored image G(x) or the ground truth image y 603 such that the generative network G 610 follows a distribution of the ground truth image y 603.

An adversarial loss $\mathcal{L}_{cycle}$ occurring by the path of the cyclic GAN may be represented by Equation 3 below, for example.

$$\mathcal{L}_{cycle} = \|F(G9x)) - x\| + \|G(F(y)) - y\| \qquad \text{Equation 3:}$$

In Equation 3, $\|F(G(x)) - x\|$ may correspond to a first adversarial loss that is based on a degree of discrimination between the backpropagated image F(G(x)) obtained by backpropagating the first restored image G(x) generated by the generative network G 610 based on the degraded training image x 601 through the backward network F 640 and the degraded training image x 601.

In addition, $\|F(G(x)) - y\|$ may correspond to a second adversarial loss that is based on a degree of discrimination between the second restored image G(F(y)) generated by the generative network G 610 from the backpropagated image F(y) obtained by backpropagating the ground truth image y 603 corresponding to the degraded training image x 601 through the backward network F 640 and the ground truth image y 603.

The generative network G 610 may be trained by further applying, to the contrastive loss, the first adversarial loss and the second adversarial loss.

For complementary distortions, a relatively small network may have a degrading restoration performance for another distortion (e.g., blur) in order for better restoration of one distortion (e.g., noise). However, this may be prevented by following a distribution of a ground truth image. Using the backward network F 640 in the cyclic GAN to maintain structural information of an input image in an output image may prevent the generation of a structure that is not in the input image in a general GAN architecture using a single discriminator.

Figure 7:
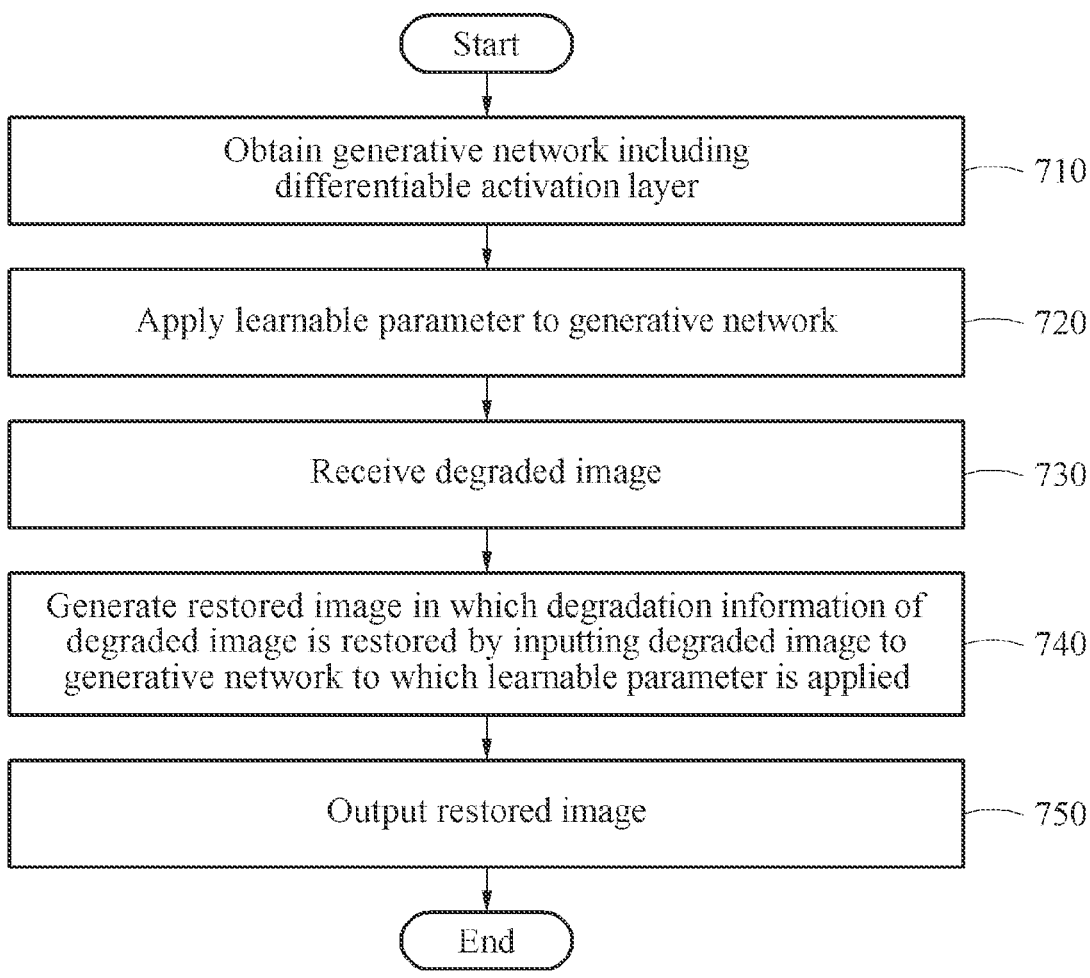
FIG. 7 illustrates an example of an image restoration method.

FIG. 7 illustrates an example of an image restoration method. In one or more embodiments described herein, operations may be performed in sequential order, but are not necessarily performed in sequential order. For example, the operations may be performed in different orders, and at least two of the operations may be performed in parallel.

Referring to FIG. 7, an electronic device of one or more embodiments may output a restored image through operations 710 through 750. The electronic device may be, as non-limiting examples, the image restoration apparatus 100 of FIG. 1, an electronic device 910 of FIG. 9, and/or an electronic device 1100 of FIG. 11.

In operation 710, the electronic device may obtain a generative network including a differentiable activation layer. For example, the electronic device may obtain the generative network including the differentiable activation layer by invoking the generative network stored in a memory. For example, as described above with reference to FIGS. 2A and 2B, the generative network may be trained in advance based on a contrastive loss that results in a first difference between a third output of the generative network and a first output of a first teacher network being smaller than a second difference between the third output and a second output of a second teacher network. In this example, the second teacher network may be shallower than the first teacher network in terms of depth. The first teacher network and the second teacher network may each include a differentiable activation layer, and may be trained in advance to infer differential images corresponding to a degraded image.

For example, the differentiable activation layer included in the generative network may be represented by Equation 4 below, for example, and may be implemented as an ELU activation layer including a learnable second parameter $\alpha$.

$$ELU(x) = \begin{cases} x, & \text{if } x > 0 \\ \alpha * (\exp(x) - 1), & \text{if } x \leq 0 \end{cases} \qquad \text{Equation 4}$$

Alternatively or additionally, the differentiable activation layer may be represented by Equation 5 below, for example, and be implemented as a softplus activation layer including a learnable second parameter $\beta$.

$$\text{Softplus } (x) = \frac{1}{\beta} * \log(1 + \exp(\beta * x)) \qquad \text{Equation 5}$$

In Equations 4 and 5 above, x may correspond to an input, i.e., a degraded image.

In operation 720, the electronic device may apply a learnable parameter to the generative network obtained in operation 710. The learnable parameter may include, for example, either one or both of a first parameter of a convolution layer included in the generative network and a second parameter of the differentiable activation layer, but is not limited thereto.

The learnable second parameter $\alpha$ in Equation 4 and the learnable second parameter $\beta$ in Equation 5 may be applied to the generative network to be used for tuning degradation information of the degraded image. The term "tuning" may be adjusting the degradation information and include, for example, scaling a parameter value of the degradation information by a predetermined ratio, adding a value to the parameter value, clipping (or limiting) the parameter value to a value, and assigning a specific value to the parameter value. For example, for denoising, environmental information associated with an environment in which the degraded image is captured may be applied as a tuning condition. The degraded image (the degraded image 110 of FIG. 1, as a non-limiting example) may be captured in various environments. In an example, denoising the degraded image 110 using a single neural network may not desirably remove noise based on noise intensity.

The electronic device may perform the tuning on the degradation information according to a situation, instead of using the generative network as the single neural network. For example, when the degraded image is captured under a low-illuminance environment, the electronic device may perform the tuning on the degradation information such that the generative network removes more noise to prevent noise from being left in the degraded image. When the tuning is performed such that a noise parameter indicates a high noise level through the scaling or adding, the generative network may consider that the degraded image has greater noise than actual noise, and perform denoising corresponding to the greater noise. In contrast, when the degraded image is captured in a high-illuminance environment, the generative network may tune a noise parameter to indicate a low noise level in order to prevent over-flattening.

In another example, a user's preference for a degrading factor removal level may be applied as a tuning condition. For example, a user may prefer a noisy faded image that appears old, and another user may prefer a noise-free clean image. Also, a user may prefer a blurred soft image, and another user may prefer a blur-free sharp image. The user's preference may include a preferred noise level and a preferred blur level. The electronic device may adjust a noise parameter and/or blur parameter based on the user's preference, and a noise and/or blur removal level by the generative network may thereby be adjusted.

In operation 730, the electronic device may receive a degraded image. The electronic device may receive the degraded image to be restored through a communication interface (a communication interface 1170 of FIG. 11, as a non-limiting example). For example, the degraded image may be captured by a UDC of the electronic device, but is not limited thereto.

In operation 740, the electronic device may generate a restored image in which degradation information of the degraded image is restored by inputting the degraded image received in operation 730 to the generative network to which the learnable parameter is applied in operation 720.

In operation 750, the electronic device may output the restored image generated in operation 740. The electronic device may output the restored image through a display (a display 1150 of FIG. 11, as a non-limiting example) or through a communication interface (a communication interface 1170 of FIG. 11, as a non-limiting example) to the outside.

Figure 8:
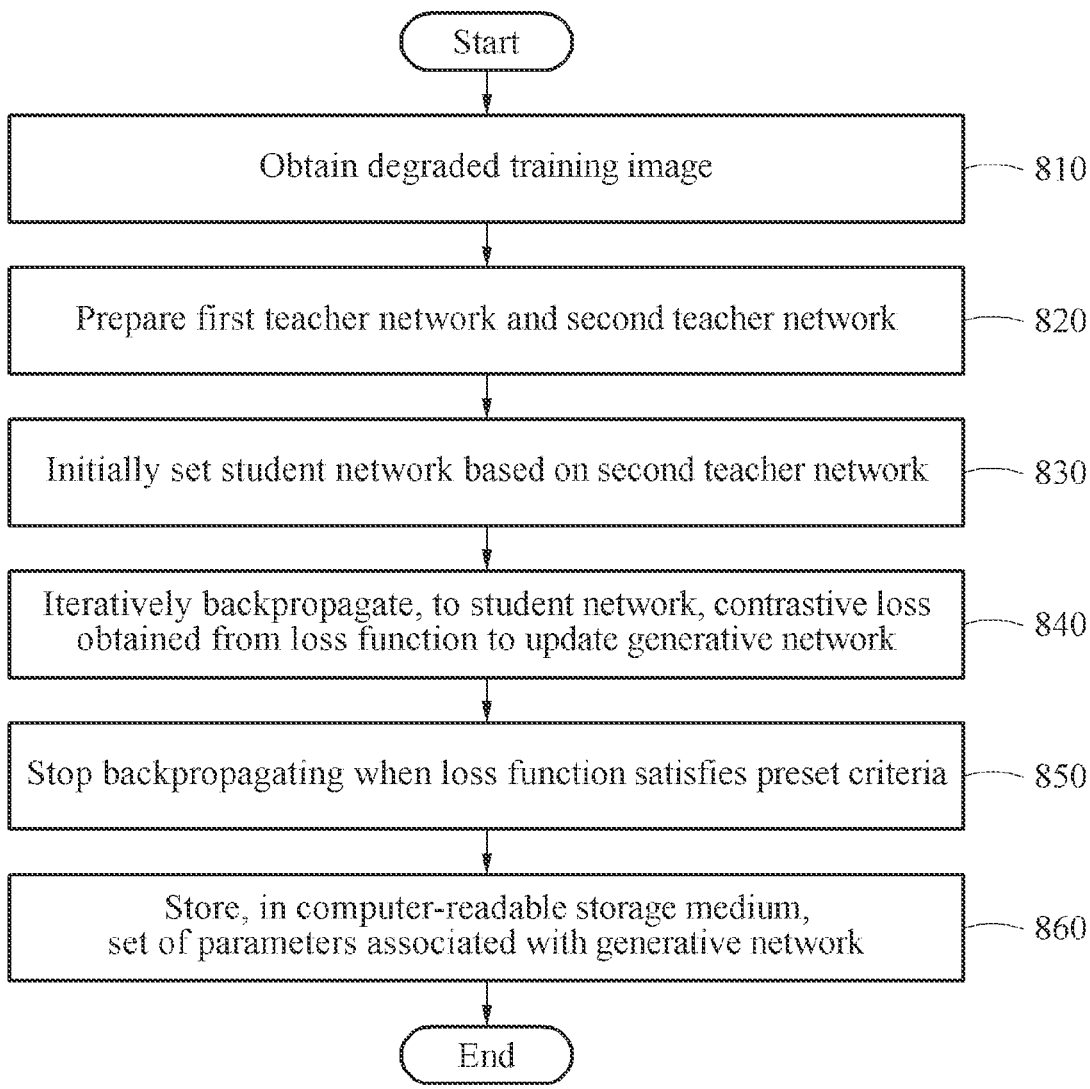
FIG. 8 illustrates an example of producing a degraded image restorer.

FIG. 8 illustrates an example of producing or generating a degraded image restorer. In one or more embodiments described herein, operations may be performed in sequential order, but are not necessarily performed in sequential order. For example, the operations may be performed in different orders, and at least two of the operations may be performed in parallel.

Referring to FIG. 8, a degraded image restorer may be stored in a non-transitory computer-readable storage medium, and may include a generative network including a differentiable activation layer. The generative network may be produced or generated through operations 810 through 860 to be described hereinafter. The generative network may be or correspond to the image restoration network 130 of FIG. 1, in a non-limiting example.

In operation 810, the degraded image restorer may obtain a degraded training image. The degraded training image may be, for example, an image degraded or distorted by either one or both of noise and blur, but is not limited thereto.

In operation 820, the degraded image restorer may prepare, generate, or obtain a first teacher network and a second teacher network. The first teacher network and the second teacher network may each include a differentiable activation layer, and may be trained in advance to restore the degraded training image. A depth of the first teacher network may be greater than a depth of the second teacher network. The first teacher network and the second teacher network may be trained to infer differential images corresponding to the degraded training image.

In operation 830, the degraded image restorer may initially set a student network based on the second teacher network. For example, the degraded image restorer may set an initial value such that the student network has the same weight as the second teacher network, and/or may generate the student network by reproducing (or replicating) the second teacher network.

In operation 840, the degraded image restorer may iteratively backpropagate, to the student network, a contrastive loss obtained from a loss function to update the generative network. The contrastive loss may be a loss that satisfies Equation 2 described above, for example, a loss that decreases a first difference between a first output of the first teacher network and a third output of the student network and increases a second difference between the third output and a second output of the second teacher network.

In addition, as represented by Equation 1 above, the degraded image restorer may iteratively backpropagate the contrastive loss to the student network by further applying, to the contrastive loss, a ground truth loss between the first output of the first teacher network and a ground truth corresponding to the degraded training image and one or more high-order derivative losses of a differential inference cost function corresponding to each of the first output and the ground truth.

According to examples, the degraded image restorer may classify degradation information affecting a corresponding region for each region of the degraded training image, and may be used such that the student network may be trained by a teacher network corresponding to the classified degradation information. The degradation information may include, for example, either one or both of noise and blur.

For example, the degraded image restorer may iteratively backpropagate the contrastive loss to the student network by further applying, to the contrastive loss, either one or both of a first loss that decreases a first difference between the third output and a deblurred first output of the first teacher network identifying a blurred region corresponding to degradation information for each region of the degraded training image and increases a second difference between the third output and a second deblurred output of the second teacher network identifying the blurred region, and a second loss that decreases a third difference between the third output and a first denoised output of the first teacher network identifying a noisy region corresponding to degradation information for each region of the degraded training image and increases a fourth difference between the third output and a second denoised output of the second teacher network identifying the noisy region. For a non-limiting example of the iterative backpropagating to the student network by further applying either one or both of the first loss and the second loss to the contrastive loss, reference may be made to what has been described above with reference to FIG. 5. Alternatively or additionally, the degraded image restorer may further add, to the generative network, a cyclic GAN that maintains a performance of restoring all degradations to restore a multi-degraded image in which noise and blur are mixed.

In an example, the degraded image restorer may iteratively backpropagate the contrastive loss to the student network by further applying, to the contrastive loss, a first adversarial loss that is based on a degree of discrimination between the degraded training image and an image backpropagated from a first restored image generated by the student network based on the degraded training image, and a second adversarial loss that is based on a degree of discrimination between a ground truth image corresponding to the degraded training image and a second restored image generated by the student network by backpropagating the ground truth image. For a detailed description of an architecture and path of the cyclic GAN added to the generative network, reference may be made to what has been described above with reference to FIG. 6.

In operation 850, when the loss function satisfies preset criteria, the degraded image restorer may stop backpropagating.

In operation 860, the degraded image restorer may store a set of parameters associated with the generative network in a computer-readable storage medium. The set of the parameters may include either one or both of a parameter of a convolution layer included in the generative network and a parameter of the differentiable activation layer, but is not limited thereto. The parameter used herein may be construed as a weight of a neural network or a corresponding layer. The degraded image restorer may store the set of the parameters associated with the generative network in an area in the storage medium that is prepared for the generative network.

The degraded image restorer may restore degradation information of a degraded image using, as the generative network, the student network trained as described above.

Figure 9:
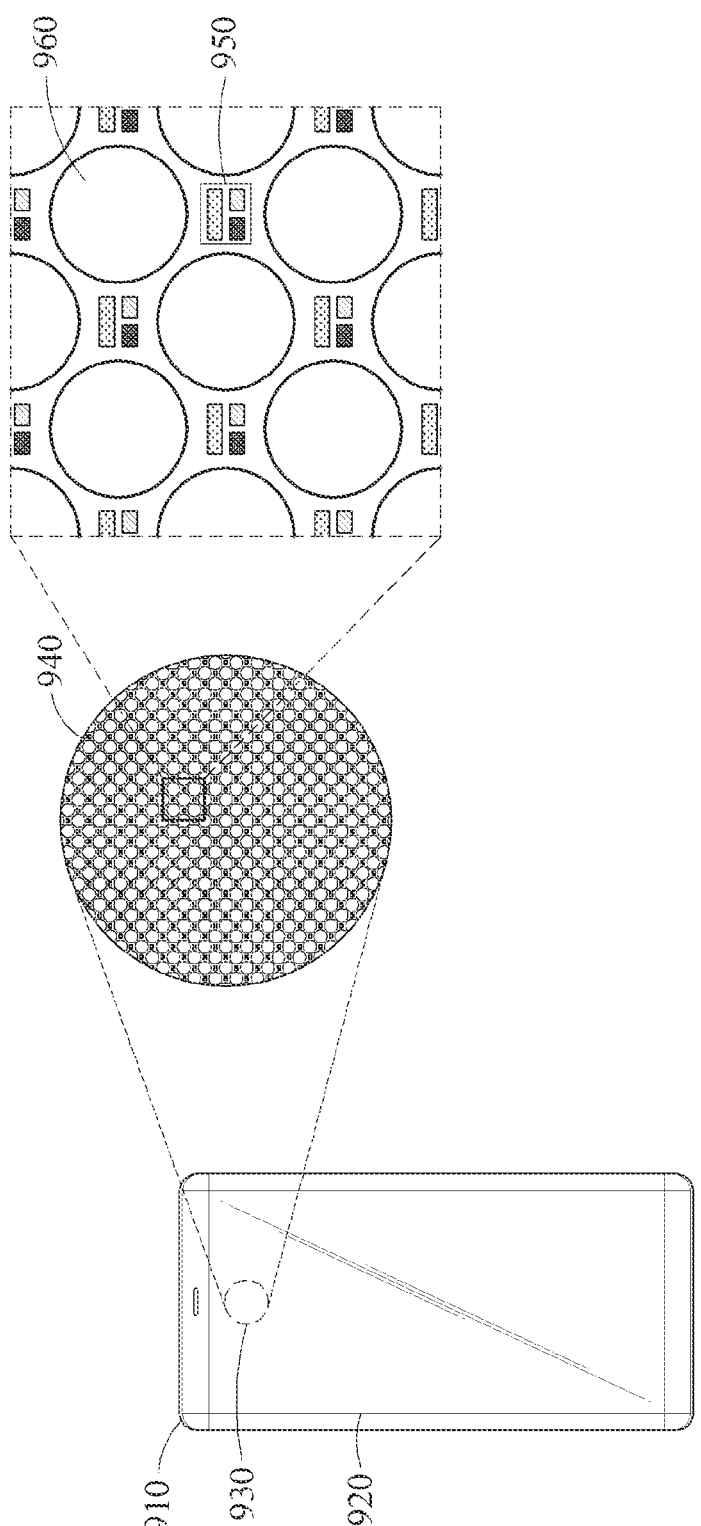
FIG. 9 illustrates an example of an electronic device providing an under-display camera (UDC).

FIG. 9 illustrates an example of an electronic device providing a UDC. Referring to FIG. 9, an electronic device 910 of one or more embodiments may include a UDC disposed under an area 930 of a display 920. As a camera (e.g., the UDC) is disposed inside the electronic device 910 under the display 920, a camera area allocated for the exposure of the camera may also be implemented as a display area. For the display area of a maximum size, the display 920 may be provided in the form of a notch or in the form of a quadrangle without the allocation of the camera area. Although the electronic device 910 is illustrated as a smartphone in FIG. 9, the electronic device 910 may also be another device including the display 920.

As illustrated, a display area 940 is an enlargement of a display panel of the area 930, and may include a display pixel 950 and a hole 960. The hole 960 may not be limited to a circular shape, and may be provided in various shapes such as an ellipse or quadrangle. The hole 960 may also be referred to as a micro-hole. The display pixel 950 and the hole 960 may be arranged in the area 930 in a consistent pattern. Such an arrangement pattern may also be referred to as a hole pattern. For example, the hole 960 may be arranged among display pixels 950 to be closest to the display pixels 950. The UDC may generate an image (e.g., a degraded image or a UDC image) based on light provided by passing through the hole 960 from the outside. The display pixel 950 may output a panel image along with other display pixels outside the display area 940.

Figure 10:
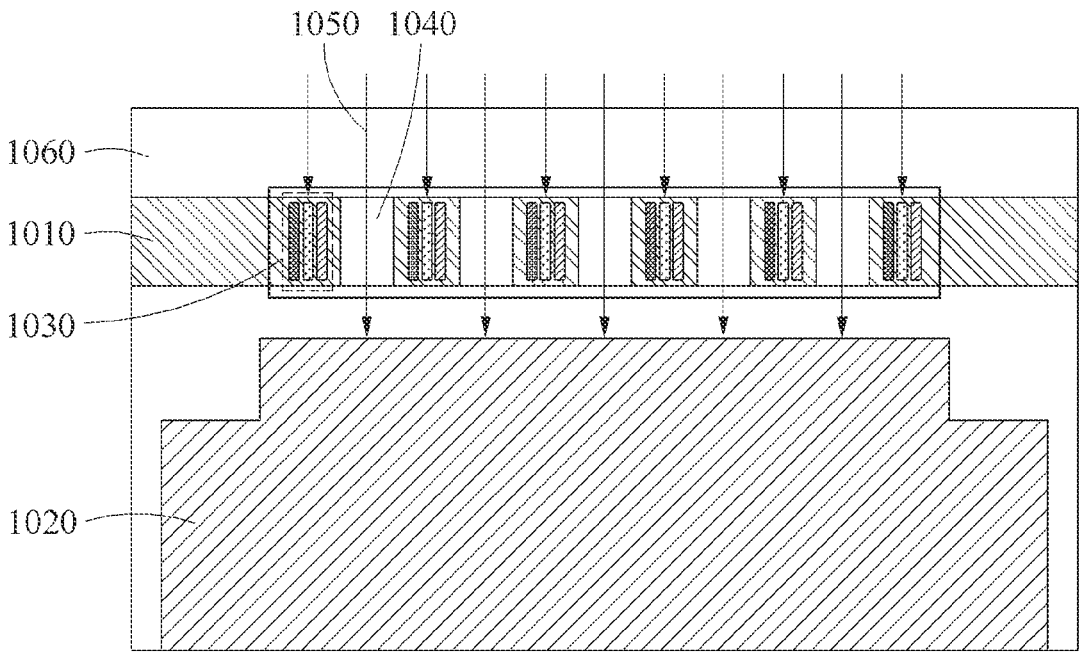
FIG. 10 illustrates an example of an arrangement relationship between a display panel and a UDC of an electronic device.

FIG. 10 illustrates an example of an arrangement relationship between a display panel and a UDC of an electronic device. FIG. 10 is a cross-sectional view of the area 930 illustrated in FIG. 9. Referring to FIG. 10, a display panel 1010 may include a display pixel 1030 that represents colors and a hole 1040 that allows an external light 1050 to be transmitted to an image sensor 1020 of the UDC. The display pixel 1030 and the hole 1040 may be alternately arranged. Each display pixel 1030 may include sub-pixels that sense a color.

On the display panel 1010, a transparent protective layer 1060 for protecting the display panel 1010 may be disposed. The protective layer 1060 may be formed with tempered glass or reinforced plastic, for example. In addition to the display pixel 1030, the display panel 1010 may include other various components to provide the display panel 1010, and the components may be used to implement a display type, for example, a liquid crystal display (LCD) and/or an organic light-emitting diode (OLED).

The image sensor 1020 may be disposed under the display panel 1010, and generate an image (e.g., a degraded image or a UDC image) by sensing the external light 1050 passing through the hole 1040. The image sensor 1020 may be designed to be ultra-small, and be provided as a plurality of image sensors. The light 1050 reaching the image sensor 1020 may be a portion of light incident on the display panel 1010 that passes through the hole 1040, and thus the UDC image generated by the image sensor 1020 may have low luminance and include great noise. In addition, each hole 1040 may act as a slit, and the UDC image may thus have blur by light diffraction. Such image quality degrading factors of the UDC image may be removed through image restoration specified for the UDC image.

Figure 11:
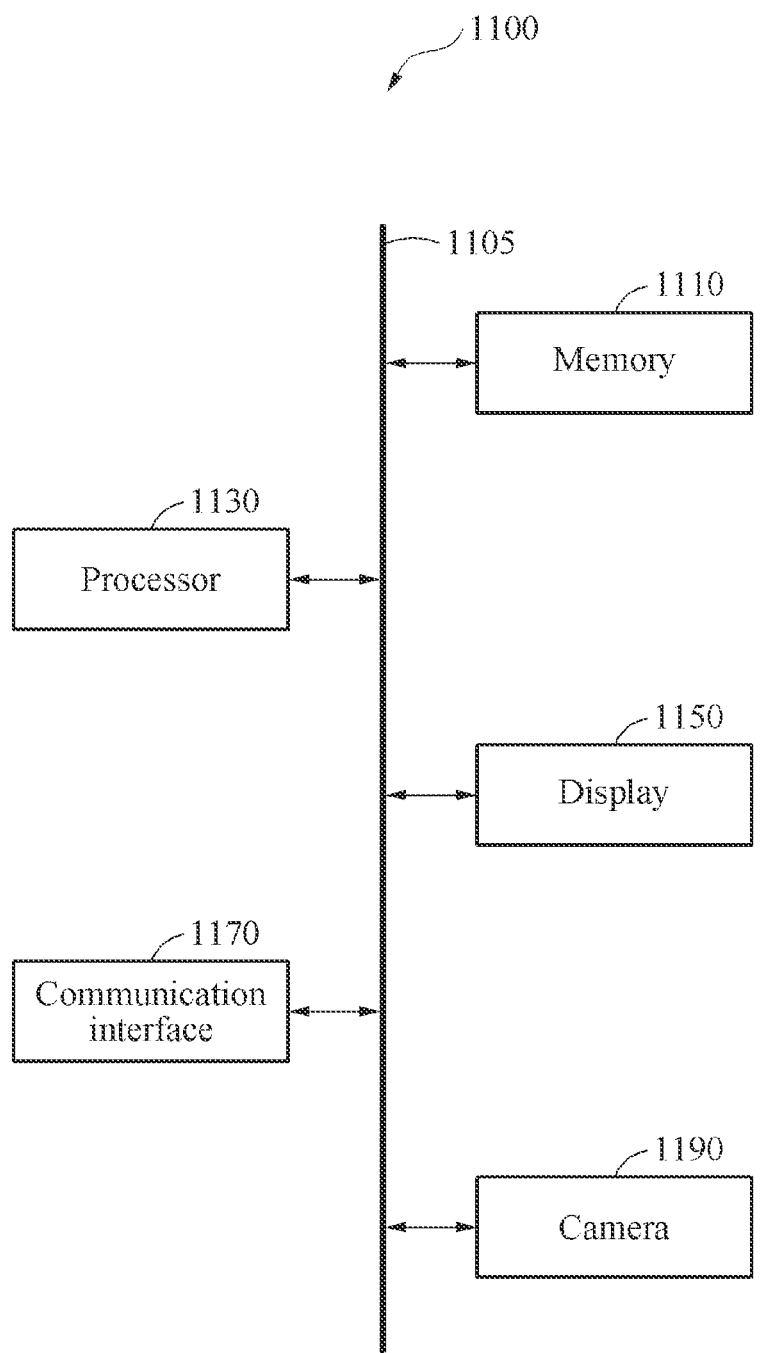
FIG. 11 illustrates an example of an electronic device.

FIG. 11 illustrates an example of an electronic device. Referring to FIG. 11, an electronic device 1100 of one or more embodiments may include a memory 1110 (e.g., one or more memories), a processor 1130 (e.g., one or more processors), a display 1150, a communication interface 1170, and a camera 1190. The memory 1110, the processor 1130, the display 1150, and the communication interface 1170 may be connected to one another through a communication bus 1105.

The electronic device 1100 may be implemented as at least a portion of, for example, a mobile device (e.g., a cellular phone, a smartphone, a personal digital assistant (PDA), a net-book, a tablet computer, a laptop computer, etc.), a wearable device (e.g., a smartwatch, a smart band, smart eyeglasses, etc.), a computing device (e.g., a desktop computer, a server, etc.), a home appliance (e.g., a television (TV), a smart TV, a refrigerator, etc.), a security device (e.g., a door lock, etc.), a medical device, a smart vehicle, or the like.

The memory 1110 may store a generative network including a differentiable activation layer. The memory 110 may store instructions executable by the processor 1130. The memory 1110 may store a degraded image received from the communication interface 1170 or the camera 1190. The memory 1110 may also store various information generated during processing performed by the processor 1130. In addition, the memory 1110 may store various data and programs. The memory 1110 may include a volatile or nonvolatile memory. The memory 1110 may include a large capacity storage medium such as a hard disk to store various data.

The processor 1130 may execute the executable instructions stored in the memory 1110. When the instructions are executed in the processor 1130, the processor 1130 may invoke the generative network from the memory 1110 and apply a parameter to the generative network. The processor 1130 may generate a restored image in which degradation information of the degraded image is restored by inputting the degraded image to the generative network. The processor 1130 may execute a program and control the electronic device 1100. A code of the program executed by the processor 1130 may be stored in the memory 1110.

The display 1150 may output the restored image generated by the processor 1130. The display 1150 may be or include the display 920 of FIG. 9, in a non-limiting example.

The communication interface 1170 may receive the degraded image input to the generative network for restoration. In an example, the camera 1190 may be or include a UDC disposed under an area the display 1150, and may generate the degraded image. The camera 1190 may include image sensor 1020 of FIG. 10, in a non-limiting example.

In addition, the processor 1130 may perform one or more, or all, of the methods or operations described above with reference to FIGS. 1 through 10. The processor 1130 may be a hardware-implemented processing device having a physically structured circuit to execute desired operations. The desired operations may include, for example, codes or instructions included in a program. The electronic device 1100 that is a hardware-implemented device may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and/or a neural processing unit (NPU).

The image restoration apparatuses, first discriminators, second discriminators, the electronic devices, displays, areas, display areas, display pixels, holes, display panels, image sensors, external lights, transparent protective layers, memories, processors, communication interfaces, cameras, communication buses, image restoration apparatus 100, first discriminator 620, second discriminator 630, electronic device 910, display 920, area 930, display area 940, display pixel 950, hole 960, display panel 1010, image sensor 1020, display pixel 1030, hole 1040, external light 1050, transparent protective layer 1060, electronic device 1100, memory 1110, processor 1130, display 1150, communication interface 1170, camera 1190, communication bus 1105, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD- Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with degraded image restoration, the method comprising:
    training a first teacher network of an image restoration network and a second teacher network of the image restoration network to infer differential images corresponding to a degraded training image, wherein each of the first teacher network and the second teacher network comprises a differentiable activation layer and a performance of the first teacher network is greater than that of the second teacher network;
    initially setting a student network of the image restoration network based on the second teacher network; and
    training the student network to infer a differential image corresponding to the degraded training image by iteratively backpropagating, to the student network, a contrastive loss that decreases a first difference between a third output of the student network and a first output of the first teacher network and increases a second difference between the third output and a second output of the second teacher network.

2. The method of claim 1, wherein the training of the student network comprises iteratively backpropagating the contrastive loss to the student network by further applying, to the contrastive loss, a ground truth loss between the first output of the first teacher network and a ground truth corresponding to the degraded training image and one or more high-order derivative losses of a differential inference cost function corresponding to each of the first output and the ground truth.

3. The method of claim 1, wherein the first teacher network, the second teacher network, and the student network are trained based on a same one or more functions having a similar characteristic.

4. The method of claim 1, wherein the contrastive loss comprises a loss that, by the iterative backpropagation, decreases the first difference determined for each channel of the third output and the first output and increases the second difference determined for each channel of the third output and the second output.

5. The method of claim 1, wherein the training of the student network comprises iteratively backpropagating the contrastive loss to the student network by further applying, to the contrastive loss, either one or both of:

a first loss that decreases a first difference between the third output and a deblurred first output of a first deblurring teacher network identifying a blurred region corresponding to degradation information of each region of the degraded training image and increases a second difference between the third output and a deblurred second output of a second deblurring teacher network identifying the blurred region; and a second loss that decreases a third difference between the third output and a denoised first output of a first denoising teacher network identifying a noisy region corresponding to degradation information of each region of the degraded training image and increases a fourth difference between the third output and a denoised second output of a second denoising teacher network identifying the noisy region.

6. The method of claim 5, wherein the degradation information comprises either one or both of noise and blur.

7. The method of claim 1, wherein the training of the student network comprises iteratively backpropagating the contrastive loss to the student network by further applying, to the contrastive loss, a first adversarial loss that is based on a degree of discrimination between the degraded training image and a backpropagated image obtained by backpropagating a first restored image generated by the student network based on the degraded training image and a second adversarial loss that is based on a degree of discrimination between a ground truth image corresponding to the degraded training image and a second restored image generated by the student network by backpropagating the ground truth image.

8. The method of claim 7, wherein the image restoration network further comprises:

a first discriminator configured to determine a difference between the degraded training image and the back-propagated image of the first restored image;

a second discriminator configured to determine a difference between the ground truth image and the second restored image; and a backward network configured to backpropagate the first restored image or the ground truth image.

9. A non-transitory computer-readable storage medium storing instructions that, when executed by one or more processors, configure the one or more processors to perform the method of claim 1.

10. The method of claim 1, wherein the initially setting of the student network based on the second teacher network comprises:

setting an initial value such that the student network has a same weight as that of the second teacher network; or generating the student network by replicating the second teacher network.

11. A processor-implemented method with degraded image restoration, the method comprising:

applying a learnable parameter to a generative network comprising a differentiable activation layer;

generating a restored image in which degradation information of a degraded image is restored by inputting the degraded image to the generative network to which the learnable parameter is applied; and outputting the restored image, wherein the learnable parameter comprises a second learnable parameter.

12. The method of claim 11, wherein the differentiable activation layer corresponds to the following equation, and is implemented by an exponential linear unit (ELU) activation layer comprising the second learnable parameter $\alpha$, $$ELU(x) = \begin{cases} x, & \text{if } x > 0 \\ \alpha * (\exp(x) - 1), & \text{if } x \leq 0 \end{cases}. \qquad \text{Equation}$$

13. The method of claim 11, wherein the differentiable activation layer corresponds to the following equation, and is implemented by a softplus activation layer comprising the second learnable parameter $\beta$, $$\text{Softplus } (x) = \frac{1}{\beta} * \log(1 + \exp(\beta * x)). \qquad \text{Equation}$$

14. The method of claim 11, wherein the learnable parameter comprises a first parameter of a convolution layer comprised in the generative network.

15. The method of claim 11, wherein the generative network is trained based on a contrastive loss that, by iterative backpropagation, decreases a first difference between a first output of a first teacher network and a third output of the generative network and increases a second difference between the third output and a second output of a second teacher network having performance lower than that of the first teacher network, and the first teacher network and the second teacher network each comprises a differentiable activation layer, and are pre-trained to infer differential images corresponding to the degraded image.

16. The method of claim 11, wherein the degraded image is captured by an under-display camera (UDC).

17. A non-transitory computer-readable storage medium storing instructions that, when executed by one or more processors, configure the one or more processors to generate a degraded image restorer, comprising a generative network comprising a differentiable activation layer, by performing the following operations, for the generative network, wherein the operations comprise:

preparing a first teacher network and a second teacher network, wherein each of the first teacher network and the second teacher network comprises a differentiable activation layer and is pre-trained to restore a degraded training image, and a performance of the first teacher network is greater than that of the second teacher network;

initially setting a student network based on the second teacher network;

iteratively backpropagating, to the student network, a contrastive loss obtained from a loss function to update the generative network, wherein the contrastive loss is a loss that decreases a first difference between a third output of the student network and a first output of the first teacher network and increases a second difference between the third output and a second output of the second teacher network;

stopping the backpropagating when the loss function satisfies preset criteria; and storing a set of parameters associated with the generative network in the non-transitory computer-readable storage medium.

18. An electronic device comprising:

a memory configured to store therein a generative network comprising a differentiable activation layer;

one or more processors configured to execute executable instructions comprised in the memory; and a display, wherein, when the instructions are executed in the one or more processors, the one or more processors configured to:

invoke a generative network comprising a differentiable activation layer;

apply a learnable parameter to the generative network; and generate a restored image in which degradation information of a degraded image is restored by inputting the degraded image to the generative network to which the learnable parameter is applied, wherein the learning parameter is a second parameter of the differentiable activation layer.

19. The electronic device of claim 18, wherein the differentiable activation layer corresponds to the following equation, and is implemented by an exponential linear unit (ELU) activation layer comprising a second learnable parameter $\alpha$, $$ELU(x) = \begin{cases} x, & \text{if } x > 0 \\ \alpha*(\exp(x)-1), & \text{if } x \le 0 \end{cases}. \qquad \text{Equation}$$

20. The electronic device of claim 18, wherein the differentiable activation layer corresponds to the following equation, and is implemented by a softplus activation layer comprising a second learnable parameter $\beta$, $$\text{Softplus } (x) = \frac{1}{\beta}*\log(1 + \exp(\beta*x)). \qquad \text{Equation}$$

21. The electronic device of claim 18, wherein the learnable parameter comprises:

a first parameter of a convolution layer comprised in the generative network.

\* \* \* \* \*